(12) United States Patent
Favor et al.

(10) Patent No.: US 11,625,479 B2
(45) Date of Patent: Apr. 11, 2023

(54) VIRTUALLY-TAGGED DATA CACHE MEMORY THAT USES TRANSLATION CONTEXT TO MAKE ENTRIES ALLOCATED DURING EXECUTION UNDER ONE TRANSLATION CONTEXT INACCESSIBLE DURING EXECUTION UNDER ANOTHER TRANSLATION CONTEXT

(71) Applicant: Ventana Micro Systems Inc., San Jose, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 295 days.

(21) Appl. No.: 17/005,309

(22) Filed: Aug. 27, 2020

(65) Prior Publication Data

US 2022/0067143 A1 Mar. 3, 2022

(51) Int. Cl.
*G06F 12/00* (2006.01)
*G06F 21/52* (2013.01)
(Continued)

(52) U.S. Cl.
CPC .......... *G06F 21/52* (2013.01); *G06F 9/45558* (2013.01); *G06F 12/0864* (2013.01);
(Continued)

(58) Field of Classification Search
CPC ........ G06F 21/00; G06F 21/10; G06F 21/121; G06F 21/125; G06F 21/128; G11B 20/00086; H04N 21/44236
See application file for complete search history.

(56) References Cited

U.S. PATENT DOCUMENTS 7,552,254 B1 6/2009 Reid et al.
2006/0236074 A1* 10/2006 Williamson ........ G06F 12/1054
711/E12.063
(Continued)

OTHER PUBLICATIONS

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.
(Continued)

*Primary Examiner* — Arvind Talukdar
(74) *Attorney, Agent, or Firm* — E. Alan Davis; Huffman Law Group, PC

(57) ABSTRACT

A data cache memory mitigates side channel attacks in a processor that comprises the data cache memory and that includes a translation context (TC). A first input receives a virtual memory address. A second input receives the TC. Control logic, with each allocation of an entry of the data cache memory, uses the received virtual memory address and the received TC to perform the allocation of the entry. The control logic also, with each access of the data cache memory, uses the received virtual memory address and the received TC in a correct determination of whether the access hits in the data cache memory. The TC includes a virtual machine identifier (VMID), or a privilege mode (PM) or a translation regime (TR), or both the VMID and the PM or the TR.

12 Claims, 6 Drawing Sheets

(51) Int. Cl.
   *G06F 21/55*      (2013.01)
   *G06F 12/14*      (2006.01)
   *G06F 12/1045*    (2016.01)
   *G06F 12/0871*    (2016.01)
   *G06F 12/0895*    (2016.01)
   *G06F 9/455*      (2018.01)
   *G06F 12/0864*    (2016.01)

(52) U.S. Cl.
   CPC ...... *G06F 12/0871* (2013.01); *G06F 12/0895* (2013.01); *G06F 12/1063* (2013.01); *G06F 12/1408* (2013.01); *G06F 12/1441* (2013.01); *G06F 21/556* (2013.01); *G06F 2009/45583* (2013.01); *G06F 2009/45587* (2013.01)

(56) References Cited

U.S. PATENT DOCUMENTS

| | | | |
|---|---|---|---|
| 2008/0005504 | A1 | 1/2008 | Barnes et al. |
| 2015/0134931 | A1* | 5/2015 | Mukherjee ............ G06F 15/76 712/30 |
| 2015/0248357 | A1 | 9/2015 | Kaplan et al. |
| 2018/0173645 | A1 | 6/2018 | Parker et al. |
| 2019/0163902 | A1 | 5/2019 | Reid et al. |
| 2020/0250099 | A1* | 8/2020 | Campbell ........... G06F 12/0842 |
| 2022/0067142 | A1 | 3/2022 | Favor et al. |

OTHER PUBLICATIONS

Abu-Ghazaleh, Nael et al. "How the Spectre and Meltdown Hacks Really Worked." IEEE Spectrum. Downloaded on Nov. 24, 2019 from https://spectrum.ieee.org/computing/hardware/how-the-spectre-andmeltdown-hacks-really-worked. pp. 1-10.

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

Frogh, Anders et al. "Wrangling the Ghost: an Inside Story of Mitigating Speculative Execution Side Channel Vulnerabilities." Microsoft. Downloaded on Nov. 24, 2019 from https://i.blackhat.com/us-18/Thu-August-9/us-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983-001. pp. 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." *Journal of Cryptographic Engineering* 8, Apr. 2018. pp. 1-37.

"Virtual Cache Issues: Advanced Operating Systems COMP9242 2002/S2" Downloaded on Jul. 3, 2020 at http://www.cse.unsw.edu.au/~cs9242/02/lectures/03-cache/node8.html. pp. 1-2.

Hoe, James C. "18-447 Lecture 18: Pages Tables and TLBs" Department of ECE, Carnegie Mellon University. Downloaded. Jul. 4, 2020 at https://users.ece.cmu.edu/~jhoe/course/ece447/s16handouts/L18.pdf. pp. 1-25.

Park, Chang Hyun et al. "Efficient Synonym Filtering and Scalable Delayed Translation for Hybrid Virtual Caching." ACM SIGARCH Computer Architecture News. Jun. 2016. https://doi.org/10.1145/300787.3001160 pp. 1-13.

"ARM® Architecture Reference Manual: ARMv7-A and ARMv7-R Edition" ARM DDI 0406C.c ID051414 Copyright© 1996-1998,2000, 2004-2012, 2014 ARM. pp. B3-1392 thru B3-1394.

"ARM® Architecture Reference Manual: ARMv8, for ARMv8-A architecture provile" ARM DDI 0487F.b ID040120 Copyright©2013-2020 ARM Limited or its affiliates. pp. A2-75, D5-2685-D5-2686, D13-2962, G5-6009 thru G5-6010, and G8-6181.

* cited by examiner

VIRTUALLY-TAGGED DATA CACHE MEMORY THAT USES TRANSLATION CONTEXT TO MAKE ENTRIES ALLOCATED DURING EXECUTION UNDER ONE TRANSLATION CONTEXT INACCESSIBLE DURING EXECUTION UNDER ANOTHER TRANSLATION CONTEXT

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attach. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system (OS) shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2[index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1 [index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1. However, because the branch predictor has been maliciously mis-trained, it predicts that the malicious index1 value is in the bounds of array1 (i.e., index1<array1size). Therefore, the processor speculatively executes "array1 [index1]" using the malicious index1 value. This results in the secret data byte value being loaded from the out-of-bounds location in the victim's memory into a register of the processor, namely from the address of the secret data byte.

Because the attacker flushed the value of array1_size from cache prior to invoking the victim code, the processor must bring in array1_size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2 [probe_value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it is likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array (4) through speculative execution because of the branch prediction, indexing the first array with the malicious value in order to retrieve the secret byte; (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache liens, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "RIDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an operation is committed to cache memory, it is temporarily stored in a store buffer—a table of address, value, and "is valid" entries. Speculative store-to-load forwarding logic enables the store buffer to forward store data to be used as operands in younger operations. Fallout exploits this to monitor recent stores performed by other programs, containers, operating systems, and virtual machines running on the same hardware thread.

The RIDL or MFBDS variant exploits the design of fill buffers in some processors that support hyper-threading. Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious operation even as the load port data is in-flight to the register file. Because a single pass of this attack may recover only some of the bits, the attack may be run repeatedly to probabilistically discover a more complete set of data.

SUMMARY

In one embodiment, the present disclosure provides a data cache memory for mitigating side channel attacks in a processor that comprises the data cache memory and that includes a translation context (TC). The data cache includes a first input that receives a virtual memory address, a second input that receives the TC, and control logic. The control logic, with each allocation of an entry of the data cache memory, uses the received virtual memory address and the received TC to perform the allocation of the entry. The control logic also, with each access of the data cache memory, uses the received virtual memory address and the received TC in a correct determination of whether the access hits in the data cache memory. The TC includes a virtual machine identifier (VMID), or a privilege mode (PM) or a translation regime (TR), or both the VMID and the PM or the TR.

In another embodiment, the present disclosure provides a method for mitigating side channel attacks by a data cache memory in a processor that includes a translation context (TC). The method includes receiving a virtual memory address and receiving the TC. The method also includes, with each allocation of an entry of the data cache memory, using the received virtual memory address and the received TC to perform the allocation of the entry. The method also includes, with each access of the data cache memory, using the received virtual memory address and the received TC in a correct determination of whether the access hits in the data cache memory. The TC includes a virtual machine identifier (VMID), or a privilege mode (PM) or a translation regime (TR), or both the VMID and the PM or the TR.

In yet another embodiment, the present disclosure provides a non-transitory computer-readable medium having instructions stored thereon that are capable of causing or configuring a data cache memory for mitigating side channel attacks in a processor that includes a translation context (TC) to perform operations. The operations include receiving a virtual memory address and receiving the TC. The operations also include, with each allocation of an entry of the data cache memory, using the received virtual memory address and the received TC to perform the allocation of the entry. The operations also include, with each access of the data cache memory, using the received virtual memory address and the received TC in a correct determination of whether the access hits in the data cache memory. The TC includes a virtual machine identifier (VMID), or a privilege mode (PM) or a translation regime (TR), or both the VMID and the PM or the TR.

DETAILED DESCRIPTION

As may be observed from the foregoing, SCAs prey on processors that engage in speculative execution of instructions. Stated alternatively, speculative execution is a critical component of SCA vulnerability. As may also be observed from the foregoing, SCAs exploit the micro-architectural state of data caches of processors that engage in speculative execution of instructions as side channels. However, speculative execution and data caches significantly improve processor performance. Therefore, high performance processors must continue to include data caches and to engage in speculative execution. Embodiments of processors, data caches and methods are described herein that mitigate SCAs by allowing speculative execution and data caches, but that use additional information, i.e., in addition to the address specified by a data cache allocation/access, to allocate into and access the data cache to prevent an attacker program from successfully probing the data cache to determine secret information based on microarchitectural state left in the data cache as a result of speculative execution. More specifically, the additional information identifies a translation context (e.g., victim) under which an entry was created (allocated) in the data cache so that another translation context (e.g., attacker) cannot subsequently use (access) the cache line in the entry. That is, attempts by the attacker translation context to access the cache line brought into the data cache by the victim translation context will result in a miss. Stated alternatively, a data cache entry is only hit upon by loads/stores executing in the same translation context that brought the cache line into the data cache. Consequently, during the SCA probing phase when the attacker translation context is timing the 256 possible cache line indexes, for example, to determine the secret byte value as described above, the likelihood that the attacker will detect a time difference due to a cache hit on the special cache line that indirectly reveals the secret byte value is greatly minimized since the special cache line access will result in a miss. In one embodiment, the translation context information is included in the tag of each data cache entry when the entry is allocated, and the translation context is used in the tag compared on subsequent data cache accesses in the hit determination. In another embodiment, the translation context information is included in the index bits of the memory address to generate the set index. The translation context is a function of the address space identifier, virtual machine identifier, and/or privilege mode or translation regime under which cache memory entries are allocated and accessed.

Figure 1:
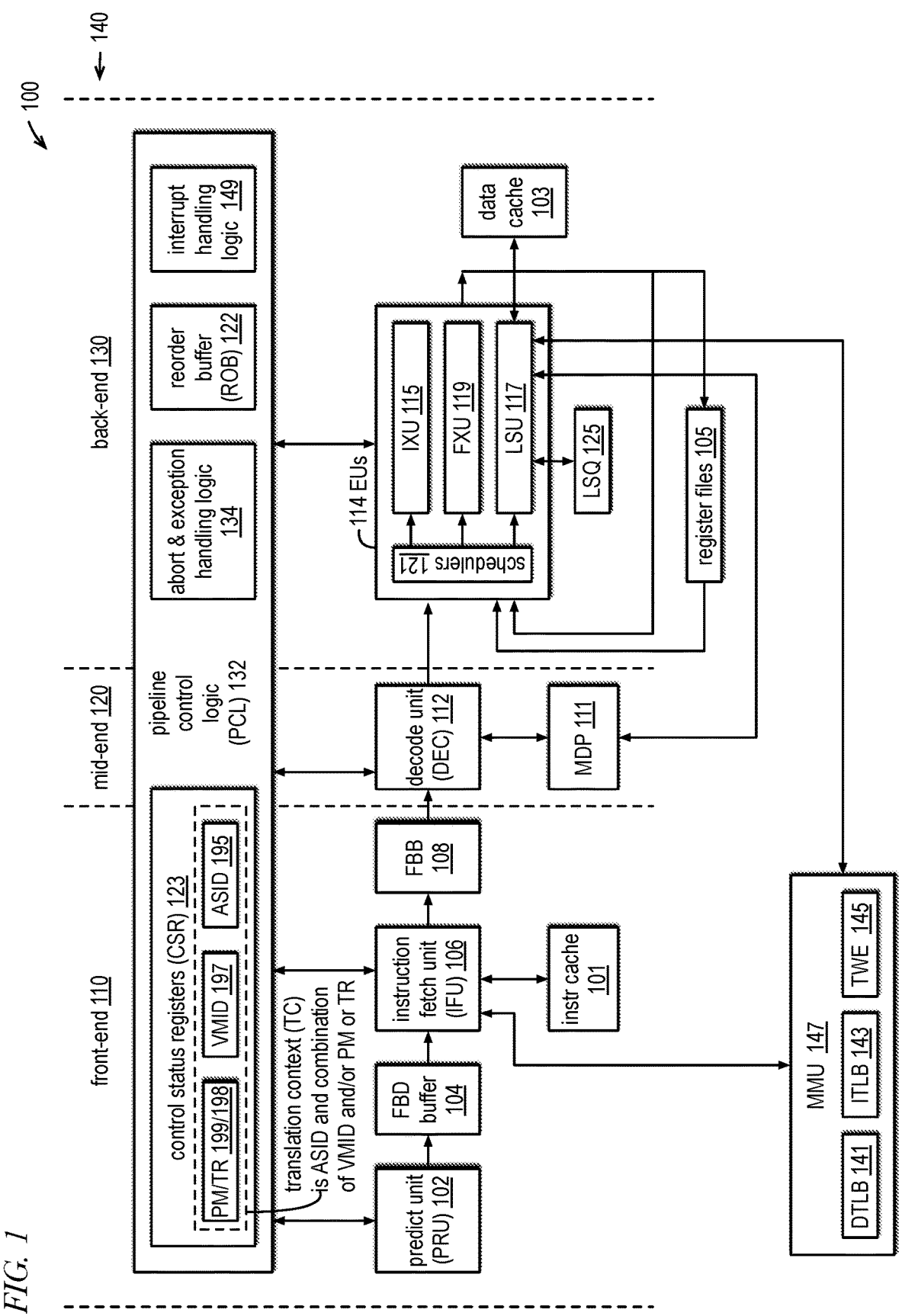
FIG. 1 is an example block diagram of a pipelined super-scalar, out-of-order execution microprocessor core that performs speculative execution in accordance with an embodiment of the present disclosure.

FIG. 1 is an example block diagram of a pipelined super-scalar, out-of-order execution microprocessor core 100 that performs speculative execution in accordance with an embodiment of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs, as described herein. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed. The core 100 may also include other blocks not shown, such as a write combining buffer, a load buffer, a bus interface unit, and various levels of cache memory above the instruction cache 101 and data cache 103, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or translation regime (TR), described below, of the processor. The data cache 103 may be in accordance with embodiments of the data cache memory 103, described below with respect to the remaining Figures, that uses the TC to mitigate SCAs by preventing entries of the data cache memory 103 allocated under one TC from being accessible during execution under another TC, or in some embodiments to at least reduce the likelihood that entries allocated under one TC will be accessible during execution under another TC. More specifically, embodiments are described in which the TC is included in the tag of entries of the data cache memory 103, and in other embodiments the TC is also included in the set index into the data cache memory 103.

A translation regime (TR) is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each TR or PM.

As shown in FIG. 1, various units of the pipeline 140 (e.g., PRU 102, IFU 106, DEC 112, EUs 114) may signal a TC-changing event to the PCL 132. In response, the PCL 132 may assert stall signals to selectively stall the units in order to prevent speculative execution of instructions dependent on their execution on the new TC until instructions dependent on their execution on the old/current TC have completed execution.

Additionally, the PCL 132 may assert flush signals to selectively flush instructions/Ops from the various units of the pipeline 140, as described herein. Additionally, the pipeline units may signal a need for an abort, as described in more detail below, e.g., in response to detection of a mis-prediction or other microarchitectural exception, architectural exception, or interrupt. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism is also used for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired. Because the ROB 122 retires all Ops and their associated instructions in program order, some Ops may complete execution many cycles before they can be retired or aborted, e.g., a speculatively executed instruction that must be aborted due to detection of a mis-prediction. For example, a speculatively executed instruction that loads a secret data byte could complete before the processor detects a mis-prediction. For another example, a speculatively executed instruction that uses the secret data byte value to modify a previously flushed cache that becomes a side channel to be probed by an SCA to detect the secret data byte could complete before the processor detects the mis-prediction. However, advantageously, embodiments are described in which the data cache memory 103 uses the TC to cause an access operating under one TC to miss entries created under another TC even though they use the same memory address.

A TC-changing instruction may change the PM or TR, the ASID, and/or the VMID according to different embodiments, as described above. Such an instruction may explicitly or implicitly update one or more of the PM 199 or TR 198, VMID 197 and/or ASID 195 to accomplish the TC change. Examples of TC-changing instructions include, but are not limited to, a system call or return from system call instruction, a software interrupt, an instruction that enters or exits a virtual machine, an instruction that changes the ASID, VMID, PM or TR, etc. In one embodiment, a TC-changing instruction may write to a CSR 123 that holds the base address of the page table structure, e.g., in the RISC-V ISA, the SATP register associated with the current translation regime.

Examples of exceptions may include architectural exceptions such as, but not limited to an invalid opcode fault, debug breakpoint, or illegal instruction fault (e.g., insufficient privilege mode) that may be detected by the DEC 112, a page fault or access fault that may be detected by the LSU 117, and an attempt to fetch an instruction from a non-executable page or a page the current process does not have permission to access that may be detected by the IFU 106. Examples of exceptions may also include microarchitectural exceptions such as, but not limited to, a detection of a mis-prediction, e.g., by a branch predictor of a direction or target address of a branch instruction, or of a mis-prediction that store data should be forwarded to a load Op in response to a store dependence prediction, e.g., by the MDP 111. As described herein, the predictions made by the predictors may give rise to speculative execution, which provides the opportunity for SCAs.

In a conventional virtually-tagged data cache memory design in which the tag only includes the virtual address tag bits and the ASID, if the attacker generates an access with the same virtual memory address and ASID that was used by the victim to allocate the implicated cache line into the cache, the attacker will experience a hit in the cache and be able to detect the time of the access was short relative to a cache miss time, even though the attacker may have had a different VMID and/or PM or TR. This can make a conventional cache a side channel susceptible to an SCA. To address this susceptibility, embodiments of a data cache entry (e.g., entry 201 of FIG. 2) that includes the VMID and/or PM or TR, in its tag field (e.g., tag field 204 of FIG. 2) are described in more detail below. Furthermore, embodiments are described herein that use the VMID and/or PM or TR to generate the data cache 103 set index.

Figure 2:
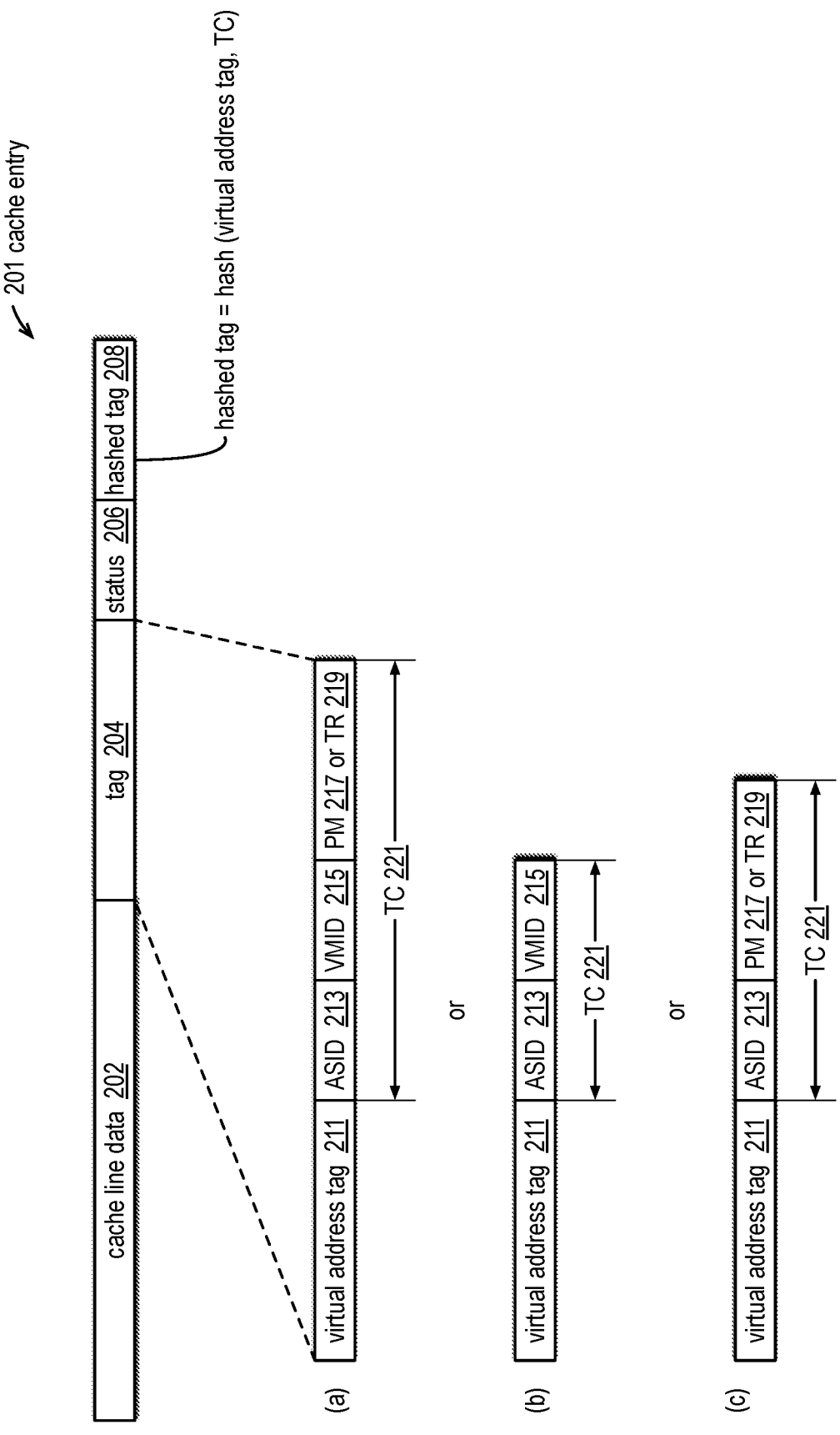
FIG. 2 is an example block diagram of a cache entry of data cache memory of FIG. 1 in accordance with embodiments of the present disclosure.

FIG. 2 is an example block diagram of a cache entry 201 of data cache memory 103 of FIG. 1 in accordance with embodiments of the present disclosure. The cache entry 201 includes cache line data 202, a tag 204, a status field 206, and a hashed tag 208. The cache line data 202 is the copy of the data brought into the cache memory from system memory, in some embodiments indirectly through a higher level of the cache memory hierarchy. The status 206 indicates the state of the cache line. More specifically, the status 206 indicates whether the cache line data is valid or invalid.

Typically, the status 206 also indicates whether the cache line has been modified since it was brought into the cache memory. The status 206 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

Generally speaking, the data cache 103 uses lower bits (e.g., index bits 304b of FIG. 3) of the virtual memory address (e.g., virtual address 304 of FIG. 3) to index into the data cache 103 and uses the remaining bits of the virtual address above the index bits as the tag bits. To illustrate by way of example, assume a 64 kilobyte (KB) data cache memory 103 arranged as a 4-way set associative cache having 64-byte cache lines; virtual address bits [5:0] are an offset into the cache line, virtual address bits [13:6] (index bits) are used as the set index, and virtual address bits [N-1:14] (tag bits) are used as the tag, where N is the number of bits of the virtual memory address. However, embodiments are described in which additional information, namely at least a portion of the translation context of the operation allocating into or accessing the data cache 103, is also included in the tag.

Figure 3:
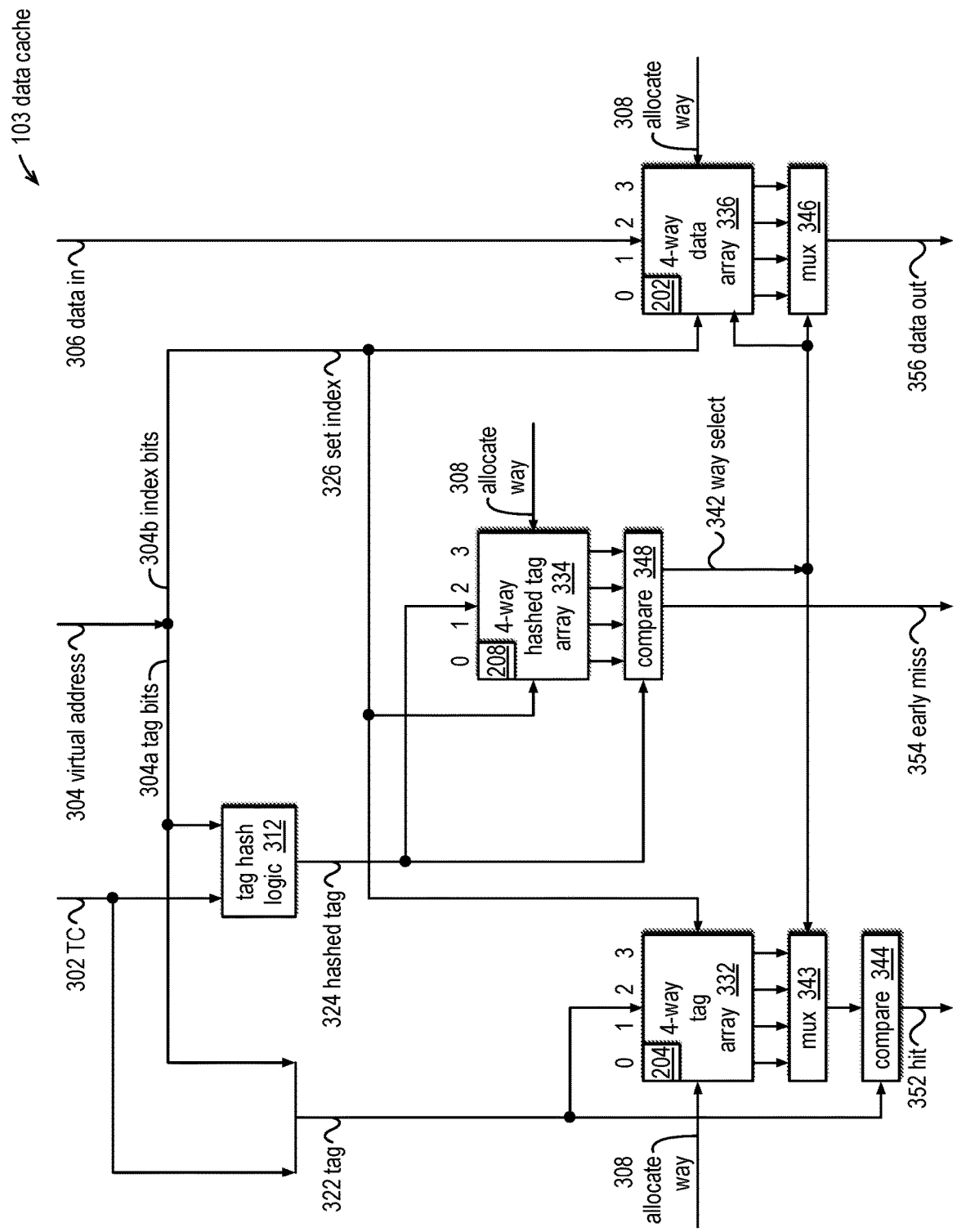
FIG. 3 is an example block diagram illustrating the data cache memory of FIG. 1 in accordance with embodiments of the present disclosure.

The tag 204 of the entry 201 of FIG. 2 is a combination of a virtual address tag field 211 and a TC field 221. The virtual address tag 211 is populated with tag bits 304a of FIG. 3 of the virtual memory address 304 of FIG. 3 specified by the operation that allocates the cache line into the data cache 103, e.g., a load/store operation. The TC 221 is populated with the TC 302 of FIG. 3 of the operation that allocates the cache line into the data cache 103. In embodiment (a) of FIG. 2, the TC 221 is the combination of an ASID 213, a VMID 215, and a PM 217 or TR 219. In embodiment (b) of FIG. 2, the TC 221 is the combination of the ASID 213 and the VMID 215. In embodiment (c) of FIG. 2, the TC 221 is the combination of the ASID 213 and the PM 217 or TR 219. Other variants of embodiments (a), (b) and (c) are contemplated that are absent the ASID 213. The ASID 213, the VMID 215, and the PM 217 or TR 219 fields are populated with the ASID 195, VMID 197, and PM 199 or TR 198, respectively, of the operation that allocates the cache line into the data cache 103. In the embodiment of FIG. 3, the TC 302 of the load/store operation includes the ASID 195, VMID 197, and PM 199 or TR 198, corresponding with the embodiments (a), (b) or (c) or their ASID-absent variants above.

Advantageously, by including the TC 302 in the tag 204 of the entry 201, i.e., in the TC field 221, SCAs may be mitigated because an attacker memory access executing with a TC 302 different from the TC 302 of the victim memory access that allocated the entry will not be able to access the allocated entry, as described in more detail below.

The hashed tag 208 is a hash of the virtual address tag bits 211 and the TC 221. That is, the virtual address tag bits and TC 302 are inputs to a hash function (e.g., performed by tag hash logic 312 of FIG. 3) that outputs the hashed tag 324. The hash function performs a logical and/or arithmetic operation on its input bits to generate output bits. For example, in one embodiment, the hash function is a logical exclusive-OR on at least a portion of the virtual address tag bits and at least a portion of the TC 302 bits. The number of output bits of the hash function is the size of the hashed tag 324 field of the data cache entry 201. For example, if the hashed tag 324 size is eight bits, then the output of the hash function is eight bits. The hashed tag 208 may be used to generate a predicted early miss indication and may be used to generate a predicted early way select signal, as described in more detail below.

FIG. 3 is an example block diagram illustrating the data cache memory 103 of FIG. 1 in accordance with embodiments of the present disclosure. The data cache memory 103 includes a tag array 332, a hashed tag array 334, a data array 336, a multiplexer 343, a comparator 344, a comparator 348, a multiplexer 346 and tag hash logic 312. The data cache memory 103 also includes a TC input 302, a virtual memory address input 304, a data in input 306 and an allocate way input 308. The data cache memory 103 also includes a hit output 352 and a data out output 356. The tag array 332 and data array 336 are random access memory arrays. In the embodiment of FIG. 3, the data cache memory 103 is arranged as a 4-way set associative cache; hence, the tag array 332 and data array 336 are arranged as 4-way set associative memory arrays. However, other embodiments are contemplated in which the associativity has a different number of ways than four, including direct-mapped and fully associative embodiments.

In the embodiment of FIG. 3, each entry of the data cache memory 103 is structured as the entry 201 of FIG. 2, having cache line data 202, tag 204, status 206 and hashed tag 208 portions. The data array 336 holds the cache line data 202 associated with each of the entries 201 of the data cache memory 103. The tag array 332 holds the tag 204 associated with each of the entries 201 of the data cache memory 103. In one embodiment, the status 206 of each entry is also stored in the tag array 332, whereas in another embodiment the data cache memory 103 includes a separate memory array for storing the status 206 of the entries. The hashed tag array 334 holds the hashed tag 208 associated with each of the entries 201 of the data cache memory 103. Although in the embodiment of FIG. 3 the data array 336 and tag array 332 are separate, other embodiments are contemplated in which the data and tag (and status) reside in the same memory array.

The tag hash logic 312 hashes the TC 302 to generate a hashed tag 324 that is provided as an input to the hashed tag array 334 and to comparator 348. As described above, in embodiment (a) of FIG. 2, the TC 302 is the ASID 195, the VMID 197, and the PM 199 or the TR 198 of the load/store operation; in embodiment (b) of FIG. 2, the TC 302 is the ASID 195 and the VMID 197; and in embodiment (c) of FIG. 2, the TC 302 is the ASID 195 and the PM 199 or the TR 198 of the load/store operation.

A tag 322 is formed as the concatenation of the TC 302 and the tag bits 304a of the virtual memory address 304. The tag 322 is provided as an input to the tag array 332 for writing into the tag 204 field of the selected entry of the tag array 332, e.g., during an allocation. In the embodiment of FIG. 3, the set index 326 is the index bits 304b of the virtual memory address 304. The set index 326 selects the set of entries in the tag array 332, hashed tag array 334 and data array 336. In the case of an allocation, the tag 322 is written into the tag 204 of the entry of the way selected by the allocate way input 308 of the selected set.

The hashed tag 324 is provided as an input to the hashed tag array 334 for writing into the hashed tag 208 of the selected entry 201 of the hashed tag array 334, e.g., during an allocation. The set index 326 selects the set of entries of the hashed tag array 334. In the case of an allocation, the hashed tag 324 is written into the hashed tag 208 of the entry of the way selected by an allocate way input 308 of the selected set. In the case of an access, comparator 348 compares the hashed tag 324 with each of the hashed tags 208 of the selected set. If there is a valid match, an early miss signal 354 is false and a way select 342 indicates the matching way; otherwise, the early miss signal 354 is true. The way select 342 is provided to mux 343 and mux 346. Further in the case of an access, the comparator 344 compares the tag 322 with the tag 204 selected by mux 343 of the selected set. If there is a valid match, the hit signal 352 is true; otherwise, the hit signal 352 is false.

The data array 336 receives the data in input 306 for writing into the cache line data 202 field of the selected entry of the data array 336, e.g., during a cache line allocation or a store operation. In the case of an allocation, the way of the selected set is selected by the allocate way input 308, and in the case of a memory access operation (e.g., load/store operation) the way is selected by the way select signal 342. In the case of a read operation (e.g., load operation), the mux 346 receives the cache line data 202 of all four ways and selects one of the ways based on the way select signal 342, and the cache line data 202 selected by the mux 346 is provided on the data out output 356.

Because the hashed tag 324 and the hashed tags 208 are small relative to the tag 322 and tags 204, the comparison performed by comparator 348 may be faster than the comparison performed by comparator 344, for example. Therefore, the way select 342 may be signaled by an earlier stage in the data cache memory 103 pipeline than an embodiment that relies on a comparison of the tags 204 of the tag array 332 to generate a way select. This may be advantageous because it may shorten the time to data out 356. Additionally, the early miss prediction 354 may be signaled by an earlier stage than the stage that signals the hit indicator 352. Thus, the hashed tag array 334 may enable a high performance, high frequency design of the core 100.

It is noted that due to the nature of the hashed tag 324, the early miss indicator 354 may indicate a false hit, i.e., the early miss indicator 354 may indicate a hit, but the correct hit indicator 352 may subsequently indicate a miss. Thus, the early miss indicator 354 is a prediction, not necessarily a correct miss indicator. This is because a first value of the tag 304a and TC 302 that is different from a second value of the tag 304a and TC 302 may hash to the same value. On the other hand, if the early miss indicator 354 indicates a miss, the miss indication is correct, i.e., the correct hit indicator 352 will also indicate a miss. This is because if two hash results are not equal (assuming they were hashed using the same hash algorithm), then they could not have been generated from equal inputs, i.e., the same input value.

Figure 4A:
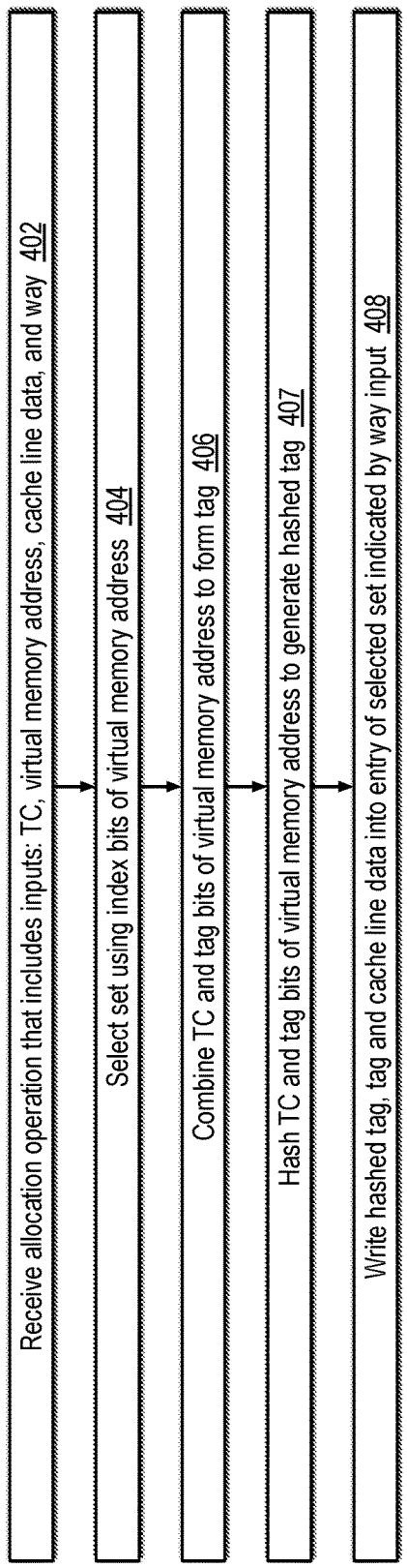
FIG. 4A is an example flowchart illustrating an operation to allocate an entry into the data cache memory of FIG. 3 in accordance with embodiments of the present disclosure.

FIG. 4A is an example flowchart illustrating an operation to allocate an entry into the data cache memory 103 of FIG. 3 in accordance with embodiments of the present disclosure. Operation begins at block 402.

At block 402, the data cache memory 103 receives an allocation operation that includes the TC input 302, the virtual memory address input 304, the data in input 306, and the allocate way input 308. Operation proceeds to block 404.

At block 404, the set index 326 selects a set of entries of the data array 336 and tag array 332. Operation proceeds to block 406.

At block 406, the tag 322 is formed by combining the TC 302 and the tag bits 304a of the virtual memory address 304. Operation proceeds to block 407.

At block 407, the TC 302 and tag bits 304a are hashed by tag hash logic 312 to generate the hashed tag 324. In one embodiment, the hash operation performed by the tag hash logic 312 is an exclusive-OR (XOR) of bits of the TC 302 and the tag bits 304a in a predetermined arrangement to generate the number of bits that is the width of the hashed tag 324. Operation proceeds to block 408.

At block 408, the tag 322 is written to the tag 204 of the entry of the way of the tag array 332 selected by the allocate way input 308 of the set selected by the set index 326. Additionally, the cache line on the data in bus 306 is written to the cache line data 202 of the entry of the way of the data array 336 selected by the allocate way input 308 of the set selected by the set index 326. Still further, the hashed tag 324 is written to the hashed tag 208 of the entry of the way of the hashed tag array 334 selected by the allocate way input 308 of the set selected by the set index 326.

Figure 4B:
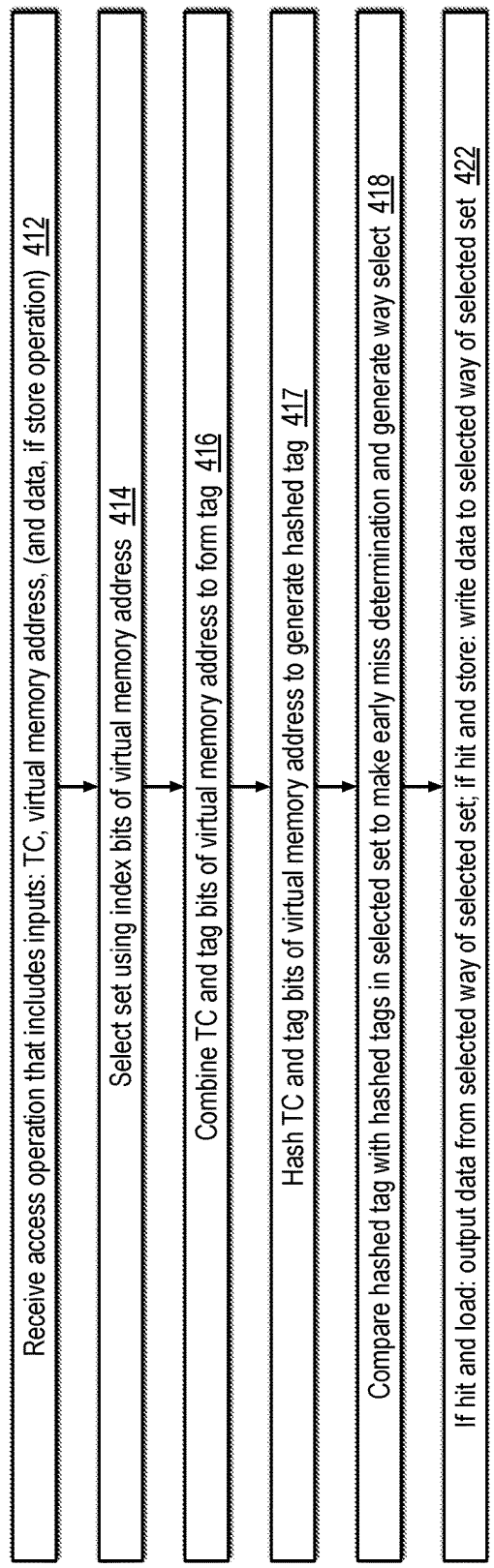
FIG. 4B is a flowchart illustrating an operation to access the data cache memory of FIG. 3 in accordance with embodiments of the present disclosure.

FIG. 4B is a flowchart illustrating an operation to access the data cache memory 103 of FIG. 3 in accordance with embodiments of the present disclosure. Operation begins at block 412.

At block 412, the data cache memory 103 receives an allocation operation that includes the TC input 302, the virtual memory address input 304, and the data in input 306 in the case of a store operation. Operation proceeds to block 414.

At block 414, the set index 326 select a set of entries of the data array 336 and tag array 332. Operation proceeds to block 416.

At block 416, the tag 322 is formed by combining the TC 302 and the tag bits 304a of the virtual memory address 304. Operation proceeds to block 417.

At block 417, the TC 302 and tag bits 304a are hashed by tag hash logic 312 to generate the hashed tag 324. Operation proceeds to block 418.

At block 418, the hashed tag 324 is compared by comparator 348 with the hashed tag 208 of each entry of the four ways of the set selected by the set index 326 to make an early miss determination (indicated on early miss signal 354) and to generate the way select 342. In an alternate embodiment, the data cache 103 is absent the hashed tag array 334, tag hash logic 312, mux 342 and early miss prediction 354, and comparator 344 compares the tag 322 with the tags 204 of all four ways of the selected set of the tag array 332 to generate the way select 342 for provision to mux 346. Operation proceeds to block 422.

At block 422, if a hit is detected (i.e., hit signal 352 is true) and the operation was a load operation, the way select 342 controls the mux 346 to select one of the ways of the selected set of the data array 336 to provide the cache line data 202 of the selected entry on the data out bus 356. If a hit is detected and the operation was a store operation, the way select 342 selects one of the ways of the selected set of the data array 336 for writing the store data 306 to the cache line data 202 of the selected entry.

As may be observed from the description of FIGS. 3, 4A and 4B, because the TC 302 of the operation that allocates an entry 201 is included in the tag 322 that is written to the tag 204 of the allocated entry 201, a subsequent access to the same virtual memory address 304 will hit on the allocated entry 201 only if the TC 302 value of the subsequent access is the same as the TC 302 of the allocation operation. Thus, advantageously, if an SCA attacker has a different TC 302 than the victim that allocated the entry 201, the attacker will be prevented from accessing the allocated entry 201 even though the attacker accesses the same virtual memory address 304.

In a core 100 having a data cache 103 that employs embodiment (b), i.e., the PM 199 or TR 198 is not included in the tag 204, whenever the PM 199 or TR 198 is changed, then the core 100 flushes the data cache 103 to achieve cache coherency. However, advantageously, within the same PM 199 or TR 198 (i.e., no flush needed), if an attacker TC 302 has a different VMID 197 than the victim that allocated the entry 201, then the attacker will be prevented from accessing the allocated entry 201 even though the attacker accesses the same virtual memory address 304. Similarly, in a core 100 having a data cache 103 that employs embodiment (c), i.e., the VMID 197 is not included in the tag 204, whenever the VMID 197 is changed, then the core 100 flushes the data cache 103 to achieve cache coherency. However, advantageously, within the same VMID 197 (i.e., no flush needed), if an attacker TC 302 has a different PM 199 or TR 198 than the victim that allocated the entry 201, then the attacker will be prevented from accessing the allocated entry 201 even though the attacker accesses the same virtual memory address 304.

Figure 5:
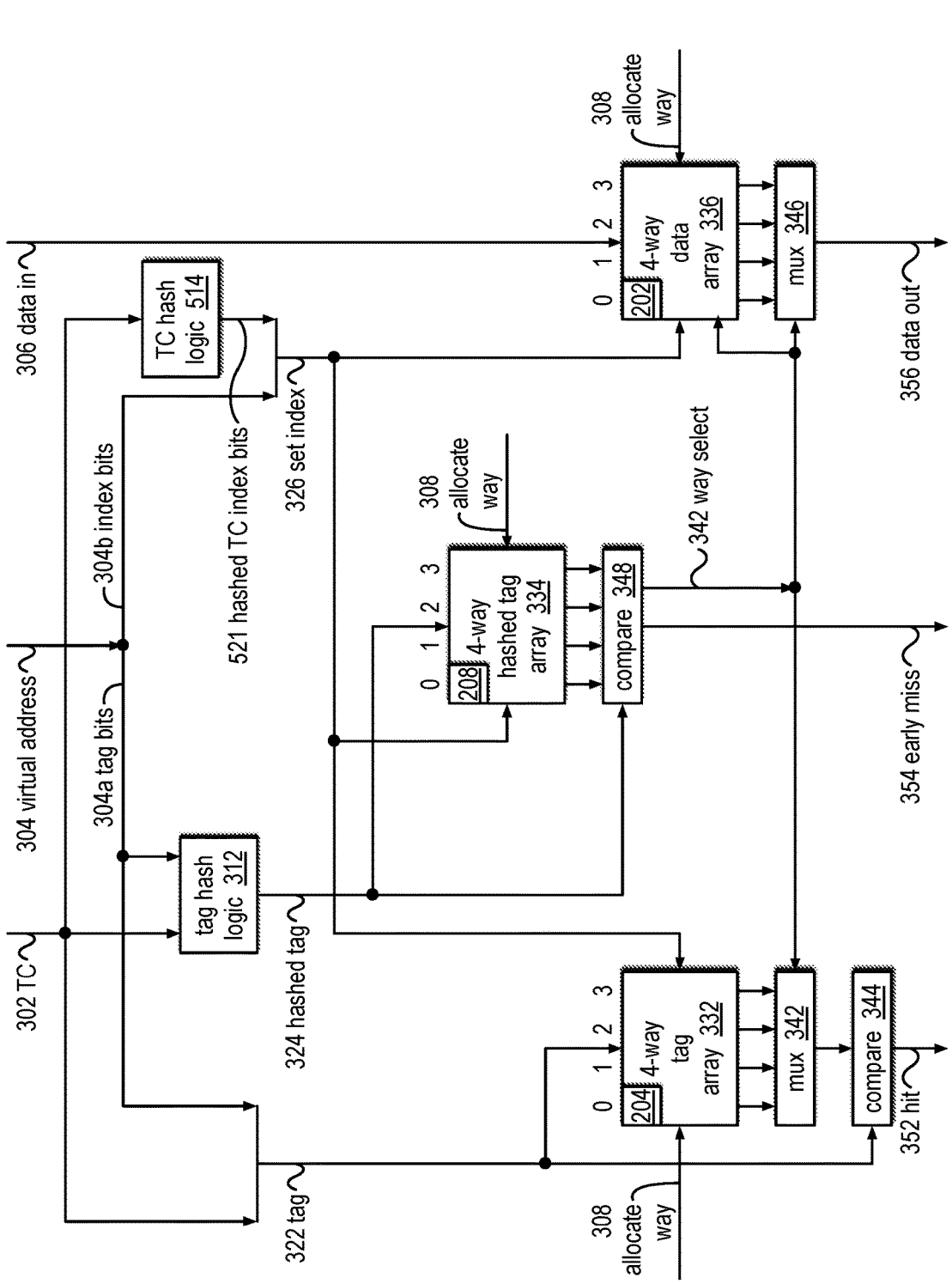
FIG. 5 is an example block diagram illustrating the data cache memory of FIG. 1 in accordance with embodiments of the present disclosure.

FIG. 5 is an example block diagram illustrating the data cache memory 103 of FIG. 1 in accordance with embodiments of the present disclosure. The data cache memory 103 of FIG. 5 is similar in many respects to the data cache memory 103 of FIG. 3 and like-numbered elements are similar. However, the data cache memory 103 of FIG. 5 includes TC hash logic 514 that hashes the TC 302 to generate hashed TC index bits 521. The hashed TC index bits 521 are combined with the index bits 304b of the virtual memory address 304 to form the set index 326. In one embodiment, the set index 326 is formed as the concatenation of the hashed TC index bits 521 and the index bits 304b of the virtual memory address 304, as shown in FIG. 5. In an alternate embodiment, the set index 326 may be formed as a hash of the hashed TC index bits 521 and the index bits 304b (which is mathematically equivalent to hashing the TC 302 and the index bits 304b); in other words, the TC hash logic 514 hashes the TC 302 and the index bits 304b to generate the set index 326.

As a result of including TC 302 information in the set index 326, when an operation allocates an entry 201 using a given virtual address 304 and a given TC 302, then a subsequent operation accesses the given virtual address 304 but with a different TC 302, a different set of entries 201 may be selected by the access than the set of entries 201 selected by the allocation even though they specified the same virtual memory address 304. This may be advantageous in mitigating an SCA as follows. Assume an attacker knows an address X that a victim allocated into the data cache memory that the attacker wants to access to cause a hit or miss. When the attacker has a different TC than the victim, the attacker must guess an address Y that will hash with the attacker's TC to the same set index that address X and the victim's TC hashed to. This may be difficult for the attacker to do, particularly if the attacker does not know the TC of the victim. In other words, advantageously the likelihood that an attacker with a different TC 302 than a victim can confidently access an entry 201 allocated by the victim is reduced.

Another effect of including the TC 302 in the set index 326 (either by concatenating the hashed TC index bits 521 and the index bits 304b, or by hashing the TC index bits 521 and the index bits 304b) is that synonyms may be created within the data cache memory 103. That is, a cache line having a given physical address could be allocated into multiple different sets of the data cache memory 103. In embodiments in which the set index 326 is formed as the concatenation of the hashed TC index bits 521 and the index bits 304b, the hashed TC index bits 521 may be different for different values of the TC 302, hence producing different values of the set index 326 even though the value of the index bits 304b is the same. In embodiments in which the set index 326 is formed as a hash of the hashed TC index bits 521 and the index bits 304b, the set index 326 (i.e., the result/output of the TC hash logic 514) may be different for different values of the TC 302, hence producing different values of the set index 326 even though the value of the index bits 304b is the same. To manage synonyms, in one embodiment, only one copy of a given physical cache line is allowed to allocate into the data cache memory 103. That is, when the cache line needs to be allocated into the data cache memory 103, if a copy of the cache line already resides in a different set of the data cache memory 103, then the already-present copy is invalidated (and first written back if it is dirty). In another embodiment, multiple copies of a cache line are allowed to allocate into the data cache memory 103, i.e., to be co-resident, but when a store is committed to any of the copies the other copies are invalidated (and first written back if it is dirty), and when a snoop is received for any of the copies all the copies are invalidated (and first written back if dirty). In another embodiment, multiple copies of a cache line are allowed to allocate into the data cache memory 103, when a store is committed to any of the copies all copies are written, and when a snoop is received all copies are invalidated (and first written back if it is dirty). Embodiments are also contemplated in which a portion of the index bits 304a are translated address bits. In the example above with 4 KB pages, 64-byte cache lines and a 4-way 64 KB data cache 103, address bits [13:12] are translated address bits and address bits [11:0] are untranslated. In such embodiments, synonyms may be created as a result of inclusion of the translated address bits in the set index.

Figure 6A:
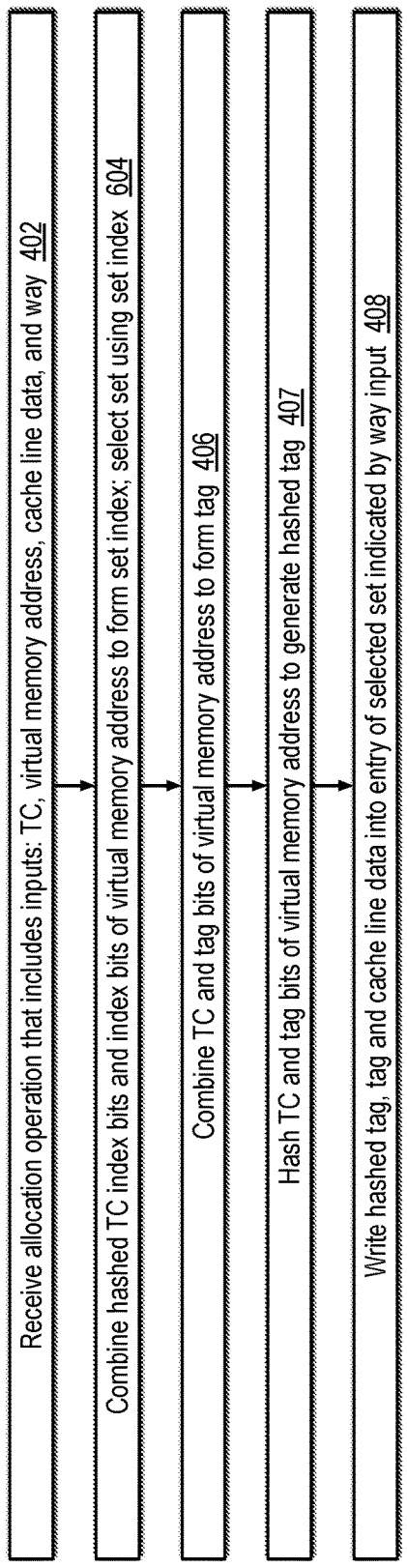
FIG. 6A is an example flowchart illustrating an operation to allocate an entry into the data cache memory of FIG. 5 in accordance with embodiments of the present disclosure.

FIG. 6A is an example flowchart illustrating an operation to allocate an entry into the data cache memory 103 of FIG. 5 in accordance with embodiments of the present disclosure. Operation begins at block 402 as in FIG. 4A and proceeds to block 604.

At block 604, the TC 302 is hashed by TC hash logic 514 to generate the hashed TC index bits 521 that are combined with the index bits 304b to form the set index 326. In one embodiment, the hash operation performed by the TC hash logic 514 is an exclusive-OR (XOR) of bits of the TC 302 in a predetermined arrangement to generate the number of bits that is the width of the hashed TC index bits 521. For example, there may be M hashed TC index bits 521 that may be concatenated with N index bits 304b to form a set index 326 of M+N bits to select $2^{(M+N)}$ sets as an illustrative example. For another example, the TC hash logic 514 may hash M bits of TC 302 with N index bits 304b to generate the set index 326. The set index 326 is then used to select a set of entries of the data array 336 and tag array 332. In some embodiments, less than all the bits of the TC 302 may be used in the various hash functions described herein. Operation proceeds to blocks 406 through 408 as in FIG. 4A.

Figure 6B:
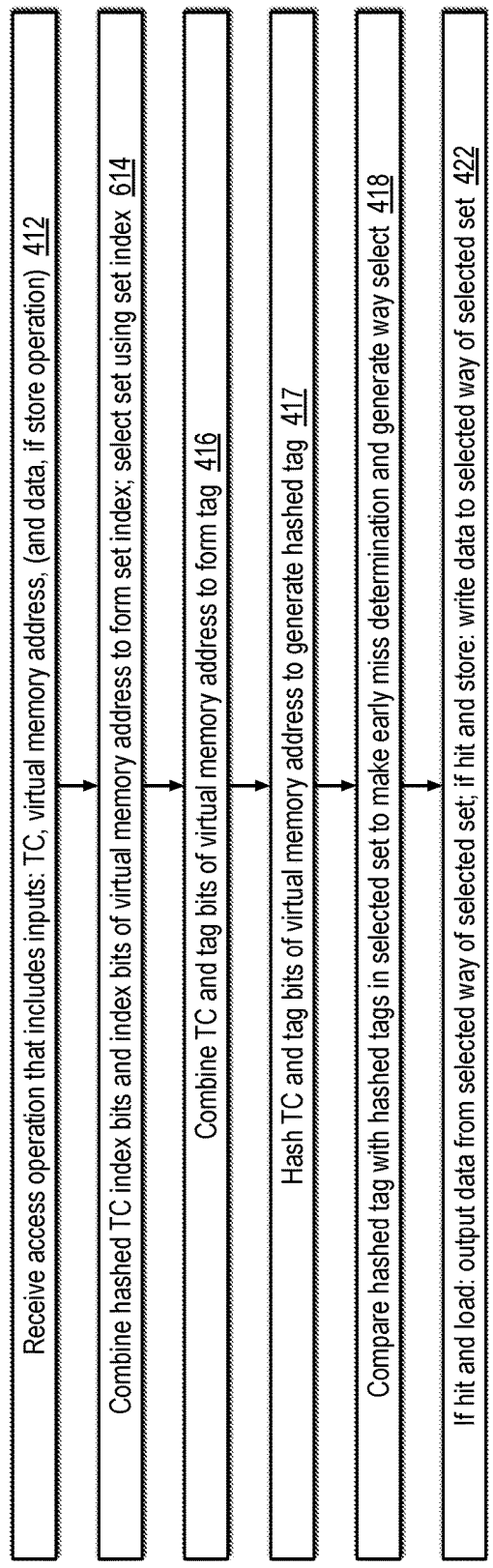
FIG. 6B is a flowchart illustrating an operation to access the data cache memory of FIG. 5 in accordance with embodiments of the present disclosure.

FIG. 6B is a flowchart illustrating an operation to access the data cache memory 103 of FIG. 5 in accordance with embodiments of the present disclosure. Operation begins at block 412 as in FIG. 4B and then proceeds to block 614.

At block 614, the TC 302 is hashed by TC hash logic 514 to generate the hashed TC index bits 521 that are combined with the index bits 304b to form the set index 326. The set index 326 is then used to select a set of entries of the data array 336 and tag array 332. Operation proceeds to blocks 416 through 422 as in FIG. 4B.

Because the value of a hash of the TC 302 is included in the set index 326, a subsequent access to the same value of the virtual memory address 304 will hit on the allocated entry 201 only if the hash of the TC 302 value of the subsequent access is the same because only then will the same set be selected. Thus, advantageously, if an SCA attacker has a different TC 302 than the victim that allocated the entry 201, the attacker access will likely experience a miss even though the attacker accesses the same virtual memory address 304. The advantage may be obtained at the expense of a potentially reduced performance in certain situations. For example, two different translation contexts that legitimately share a physical memory location may experience more cache misses. More specifically, if the two translation contexts are only reading the shared location, then performance may not suffer since there will be synonyms in the cache in embodiments that allow co-resident synonyms, as described above. However, if the two contexts are reading and writing the location (e.g., atomic read-modify-writes of a semaphore), then performance may suffer since the other synonym may need to be flushed and/or the data cache design may be more complex to handle writing to all synonyms.

Various elements of the cache memory embodiments, such as comparators 344, multiplexers 343 and 346, tag hash logic 312, comparators 348, and TC hash logic 514, may be referred to collectively and generally as control logic. In one embodiment, the control logic may function essentially as an element of a load/store unit (e.g., LSU 117 of FIG. 1), that is in communication with the data cache memory, that executes load/store and other memory operations. In one embodiment, the load/store unit includes multiple parallel execution pipelines that can receive multiple corresponding memory operations each cycle. Furthermore, although embodiments are described in which the cache memory is employed in a first level of the cache hierarchy of the processor, other embodiments are contemplated in which the cache memory is employed at higher levels of the cache hierarchy. Finally, in one embodiment the data cache memory 103 is a write-through cache.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A data cache memory for mitigating side channel attacks in a processor that comprises the data cache memory and that includes a translation context (TC), comprising:
   a first input that receives a virtual memory address;
   a second input that receives the TC;
   control logic configured to:
      with each allocation of an entry of the data cache memory:
         use the received virtual memory address and the received TC to perform the allocation of the entry; and
      with each access of the data cache memory:
         use the received virtual memory address and the received TC in a correct determination of whether the access hits in the data cache memory;
   wherein the TC comprises:
      a virtual machine identifier (VMID); or
      a privilege mode (PM) or a translation regime (TR); or
      both the VMID and the PM or the TR;
   wherein the virtual memory address comprises a tag portion;
   wherein the control logic is further configured to:
      hash at least a portion of the received TC and the received tag portion of the virtual memory address to generate a hashed tag;
   wherein the data cache memory comprises a pipeline of stages; and
   wherein the control logic is further configured to:
      with each allocation of an entry of the data cache memory:
         include the hashed tag in the entry; and
      with each access of the data cache memory:
         use the hashed tag in an early prediction of whether the access misses in the data cache memory;
         signal, by an earlier stage of the pipeline, the early prediction of whether the access misses in the data cache memory; and signal, by a later stage of the pipeline subsequent to the earlier stage, the correct determination of whether the access hits in the data cache memory.

2. The data cache memory of claim 1,
wherein the virtual memory address comprises a tag portion;
wherein to use the received virtual memory address and the received TC to perform the allocation of the entry:
the control logic includes the received tag portion of the virtual memory address and the TC in a tag of the entry; and
wherein to use the received virtual memory address and the received TC in the correct determination of whether the access hits in the data cache memory:
the control logic compares the tag of the entry with the received tag portion of the virtual memory address and the received TC.

3. The data cache memory of claim 2,
wherein the virtual memory address comprises an index portion;
wherein to use the received virtual memory address and the received TC to perform the allocation of the entry and to use the received virtual memory address and the received TC in the correct determination of whether the access hits in the data cache memory:
the control logic hashes at least a portion of the received TC and the index portion of the received virtual memory address to form a set index to select a set of entries of the data cache memory.

4. The data cache memory of claim 1,
wherein the virtual memory address comprises a tag portion;
wherein the control logic is further configured to:
hash at least a portion of the received TC and the received tag portion of the virtual memory address to generate a hashed tag;
wherein the data cache memory is organized as a set associative cache having a plurality of ways; and
wherein the control logic is further configured to:
with each allocation of an entry of the data cache memory:
include the hashed tag in the entry; and
with each access of the data cache memory:
use the hashed tag to select a way of the plurality of ways.

5. A method for mitigating side channel attacks by a data cache memory in a processor that includes a translation context (TC), comprising:
receiving a virtual memory address;
receiving the TC;
with each allocation of an entry of the data cache memory:
using the received virtual memory address and the received TC to perform the allocation of the entry; and
with each access of the data cache memory:
using the received virtual memory address and the received TC in a correct determination of whether the access hits in the data cache memory;
wherein the TC comprises:
a virtual machine identifier (VMID); or
a privilege mode (PM) or a translation regime (TR); or
both the VMID and the PM or the TR;
wherein the virtual memory address comprises a tag portion;
hashing at least a portion of the received TC and the received tag portion of the virtual memory address to generate a hashed tag;
wherein the data cache memory comprises a pipeline of stages;
with each allocation of an entry of the data cache memory:
including the hashed tag in the entry; and
with each access of the data cache memory:
using the hashed tag in an early prediction of whether the access misses in the data cache memory;
signaling, by an earlier stage of the pipeline, the early prediction of whether the access misses in the data cache memory; and
signaling, by a later stage of the pipeline subsequent to the earlier stage, the correct determination of whether the access hits in the data cache memory.

6. The method of claim 5,
wherein the virtual memory address comprises a tag portion;
wherein said using the received virtual memory address and the received TC to perform the allocation of the entry comprises:
including the received tag portion of the virtual memory address and the TC in a tag of the entry; and
wherein said using the received virtual memory address and the received TC in the correct determination of whether the access hits in the data cache memory comprises:
comparing the tag of the entry with the received tag portion of the virtual memory address and the received TC.

7. The method of claim 6, further comprising:
wherein the virtual memory address comprises an index portion;
wherein said using the received virtual memory address and the received TC to perform the allocation of the entry and said using the received virtual memory address and the received TC in the correct determination of whether the access hits in the data cache memory comprises:
hashing at least a portion of the received TC and the index portion of the received virtual memory address to form a set index to select a set of entries of the data cache memory.

8. The method of claim 5, further comprising:
wherein the virtual memory address comprises a tag portion;
hashing at least a portion of the received TC and the received tag portion of the virtual memory address to generate a hashed tag;
wherein the data cache memory is organized as a set associative cache having a plurality of ways;
with each allocation of an entry of the data cache memory:
including the hashed tag in the entry; and
with each access of the data cache memory:
using the hashed tag to select a way of the plurality of ways.

9. A non-transitory computer-readable medium having instructions stored thereon that are capable of causing or configuring a data cache memory for mitigating side channel attacks in a processor that includes a translation context (TC) to perform operations comprising:
receiving a virtual memory address;
receiving the TC;
with each allocation of an entry of the data cache memory:
using the received virtual memory address and the received TC to perform the allocation of the entry; and
with each access of the data cache memory:

using the received virtual memory address and the received TC in a correct determination of whether the access hits in the data cache memory; and wherein the TC comprises:
   a virtual machine identifier (VMID); or
   a privilege mode (PM) or a translation regime (TR); or
   both the VMID and the PM or the TR;

wherein the virtual memory address comprises a tag portion;

hashing at least a portion of the received TC and the received tag portion of the virtual memory address to generate a hashed tag;

wherein the data cache memory comprises a pipeline of stages;

with each allocation of an entry of the data cache memory:
   including the hashed tag in the entry; and with each access of the data cache memory:
   using the hashed tag in an early prediction of whether the access misses in the data cache memory,
   signaling, by an earlier stage of the pipeline, the early prediction of whether the access misses in the data cache memory; and
   signaling, by a later stage of the pipeline subsequent to the earlier stage, the correct determination of whether the access hits in the data cache memory.

10. The non-transitory computer medium of claim 9,
wherein the virtual memory address comprises a tag portion;
wherein said using the received virtual memory address and the received TC to perform the allocation of the entry comprises:
   including the received tag portion of the virtual memory address and the TC in a tag of the entry; and
   wherein said using the received virtual memory address and the received TC in the correct determination of whether the access hits in the data cache memory comprises:
      comparing the tag of the entry with the received tag portion of the virtual memory address and the received TC.

11. The non-transitory computer medium of claim 10, the operations further comprising:
wherein the virtual memory address comprises an index portion;
wherein said using the received virtual memory address and the received TC to perform the allocation of the entry and said using the received virtual memory address and the received TC in the correct determination of whether the access hits in the data cache memory comprises:
   hashing at least a portion of the received TC and the index portion of the received virtual memory address to form a set index to select a set of entries of the data cache memory.

12. The non-transitory computer medium of claim 9, the operations further comprising:
wherein the virtual memory address comprises a tag portion;
hashing at least a portion of the received TC and the received tag portion of the virtual memory address to generate a hashed tag;
wherein the data cache memory is organized as a set associative cache having a plurality of ways;
with each allocation of an entry of the data cache memory:
   including the hashed tag in the entry; and
with each access of the data cache memory:
   using the hashed tag to select a way of the plurality of ways.

* * * * *

UNITED STATES PATENT AND TRADEMARK OFFICE
CERTIFICATE OF CORRECTION

| | |
|---|---|
| PATENT NO. | : 11,625,479 B2 |
| APPLICATION NO. | : 17/005309 |
| DATED | : April 11, 2023 |
| INVENTOR(S) | : John G. Favor and Srivatsan Srinivasan |

It is certified that error appears in the above-identified patent and that said Letters Patent is hereby corrected as shown below:

In the Claims

1. In Column 23, Line 20, in Claim 9, delete "memory," and insert -- memory; --, therefor.

2. In Column 23, Line 27, in Claim 10, delete "computer medium" and insert -- computer-readable medium --, therefor.

3. In Column 24, Line 8, in Claim 11, delete "computer medium" and insert -- computer-readable medium --, therefor.

4. In Column 24, Line 21, in Claim 12, delete "computer medium" and insert -- computer-readable medium --, therefor.

Signed and Sealed this
Fifth Day of September, 2023

Katherine Kelly Vidal
*Director of the United States Patent and Trademark Office*